(12) United States Patent
Kurian et al.

(10) Patent No.: US 10,129,238 B2
(45) Date of Patent: *Nov. 13, 2018

(54) SYSTEM FOR CONTROL OF SECURE ACCESS AND COMMUNICATION WITH DIFFERENT PROCESS DATA NETWORKS WITH SEPARATE SECURITY FEATURES

(71) Applicant: BANK OF AMERICA CORPORATION, Charlotte, NC (US)

(72) Inventors: Manu Jacob Kurian, Dallas, TX (US); Darrell Johnsrud, Camas, WA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 4 days.

This patent is subject to a terminal disclaimer.

(21) Appl. No.: 15/049,605

(22) Filed: Feb. 22, 2016

(65) Prior Publication Data

US 2017/0230353 A1    Aug. 10, 2017

Related U.S. Application Data

(60) Provisional application No. 62/293,620, filed on Feb. 10, 2016.

(51) Int. Cl.
*H04L 29/06* (2006.01)
*G06Q 20/40* (2012.01)

(52) U.S. Cl.
CPC ......... *H04L 63/0815* (2013.01); *G06Q 20/40* (2013.01); *G06Q 20/405* (2013.01);
(Continued)

(58) Field of Classification Search
CPC ............. H04L 63/0815; H04L 63/0272; H04L 63/0853; H04L 63/272; G06Q 20/40; G06Q 20/405; G06Q 20/4014
See application file for complete search history.

(56) References Cited

U.S. PATENT DOCUMENTS 5,671,283 A    9/1997 Michener et al.
5,835,599 A   11/1998 Buer
(Continued)

FOREIGN PATENT DOCUMENTS

WO    2014162296 A1    10/2014
WO    2015135018 A1     9/2015

OTHER PUBLICATIONS

Buterin, Vitalik, "On Public and Private Blockchains", Aug. 7, 2015, https://blog.ethereum.org/2015/08/07/on-public-and-private-blockchains/.*

(Continued)

*Primary Examiner* — Jung W Kim
*Assistant Examiner* — Carlos M De Jesus Lassala
(74) *Attorney, Agent, or Firm* — Michael A. Springs; Moore & Van Allen PLLC; Jeffrey R. Gray

(57) ABSTRACT

A distributed block chain network having at least a private block chain portion, and in some cases a public block chain portion, allows users to take actions (e.g., accessing, viewing, storing, disseminating, validating, or the like) with respect to event information associated with events. In some aspects of the invention the distributed block chain network with the private block chain portion may be utilized to verify events and separate the private information associated with the events from the public information associated with the events. As such, the present invention provides systems for centralized control of secure access to process data networks by utilizing a private block chain; and moreover, provide systems for control of secure access and communication with different process data networks with different security requirements by utilizing one or more block chains with private block chain portions and/or public block chain portions.

20 Claims, 9 Drawing Sheets

(52) U.S. Cl.
CPC ..... *G06Q 20/4014* (2013.01); *H04L 63/0272* (2013.01); *H04L 63/0853* (2013.01)

(56) References Cited

U.S. PATENT DOCUMENTS

| | | | |
|---|---|---|---|
| 6,073,234 A | 6/2000 | Kigo et al. | |
| 6,324,286 B1 | 11/2001 | Lai et al. | |
| 6,725,303 B1 | 4/2004 | Hoguta et al. | |
| 6,850,252 B1 | 2/2005 | Hoffberg | |
| 6,973,187 B2 | 12/2005 | Gligor et al. | |
| 7,055,039 B2 | 5/2006 | Chavanne et al. | |
| 7,092,400 B2 | 8/2006 | Malzahn | |
| 7,184,549 B2 | 2/2007 | Sorimachi et al. | |
| 7,362,859 B1 | 4/2008 | Robertson et al. | |
| 7,392,384 B2 | 6/2008 | Hopkins et al. | |
| 7,428,306 B2 | 9/2008 | Celikkan et al. | |
| 7,502,933 B2 | 3/2009 | Jakobsson et al. | |
| 7,574,401 B1 | 8/2009 | Burns | |
| 7,649,992 B2 | 1/2010 | Raju et al. | |
| 7,764,788 B2 | 7/2010 | Tardo | |
| 7,979,889 B2 | 7/2011 | Gladstone et al. | |
| 8,078,874 B2 | 12/2011 | You et al. | |
| 8,107,621 B2 | 1/2012 | Celikkan et al. | |
| 8,155,311 B2 | 4/2012 | Shin et al. | |
| 8,259,934 B2 | 9/2012 | Karroumi et al. | |
| 8,358,781 B2 | 1/2013 | Schneider | |
| 8,397,841 B1 | 2/2013 | Taylor et al. | |
| 8,396,209 B2 | 3/2013 | Schneider | |
| 8,416,947 B2 | 4/2013 | Schneider | |
| 8,458,461 B2 | 6/2013 | Tardo | |
| 8,464,320 B2 | 6/2013 | Archer et al. | |
| 8,516,266 B2 | 8/2013 | Hoffberg et al. | |
| 8,590,055 B2 | 11/2013 | Yoon et al. | |
| 8,737,606 B2 | 5/2014 | Taylor et al. | |
| 8,942,374 B2 | 1/2015 | Fujisaki | |
| 8,983,063 B1 | 3/2015 | Taylor et al. | |
| 9,059,866 B2 | 6/2015 | Bar-Sade et al. | |
| 9,083,702 B2 | 7/2015 | Wied et al. | |
| 9,092,766 B1 | 7/2015 | Bedier et al. | |
| 9,298,806 B1* | 3/2016 | Vessenes | G06Q 30/00 |
| 9,635,000 B1 | 4/2017 | Muftic | |
| 9,672,499 B2 | 6/2017 | Yang et al. | |
| 2003/0126094 A1 | 7/2003 | Fisher et al. | |
| 2004/0172535 A1 | 9/2004 | Jakobsson et al. | |
| 2005/0256802 A1 | 11/2005 | Ammermann et al. | |
| 2006/0059539 A1 | 3/2006 | Shashikumar et al. | |
| 2007/0136573 A1 | 6/2007 | Steinberg | |
| 2009/0281948 A1 | 11/2009 | Carlson | |
| 2010/0279653 A1 | 11/2010 | Poltorak | |
| 2011/0078073 A1 | 3/2011 | Annappindi | |
| 2011/0197064 A1 | 8/2011 | Garcia Morchon et al. | |
| 2012/0066121 A1 | 3/2012 | Shahbazi et al. | |
| 2012/0096529 A1 | 4/2012 | Boumelle et al. | |
| 2012/0271920 A1 | 10/2012 | Isaksson | |
| 2012/0284175 A1 | 11/2012 | Wilson et al. | |
| 2013/0198061 A1 | 8/2013 | Dheer et al. | |
| 2013/0232056 A1 | 9/2013 | Schulman | |
| 2014/0006185 A1 | 1/2014 | Zurn et al. | |
| 2014/0089243 A1 | 3/2014 | Oppenheimer | |
| 2014/0310171 A1 | 10/2014 | Grossman et al. | |
| 2015/0172053 A1 | 6/2015 | Schwarz et al. | |
| 2015/0206106 A1 | 7/2015 | Yago | |
| 2015/0332283 A1 | 11/2015 | Witchey | |
| 2015/0379510 A1* | 12/2015 | Smith | G06Q 20/3829 705/71 |
| 2015/0379636 A1 | 12/2015 | Szabo et al. | |
| 2016/0012424 A1 | 1/2016 | Simon et al. | |
| 2016/0028552 A1 | 1/2016 | Spanos et al. | |
| 2016/0035054 A1 | 2/2016 | Branscomb et al. | |
| 2016/0050203 A1 | 2/2016 | Hefetz | |
| 2016/0092874 A1 | 3/2016 | O'Regan et al. | |
| 2016/0125376 A1 | 5/2016 | Beatty et al. | |
| 2016/0191243 A1† | 6/2016 | Manning | |
| 2016/0219045 A1 | 7/2016 | Toedter et al. | |
| 2016/0260169 A1* | 9/2016 | Arnold | G06Q 40/12 |
| 2016/0267474 A1* | 9/2016 | Lingham | G06Q 20/363 |
| 2016/0275461 A1 | 9/2016 | Sprague et al. | |
| 2016/0292672 A1 | 10/2016 | Fay et al. | |
| 2016/0321654 A1 | 11/2016 | Lesavich et al. | |
| 2016/0323109 A1 | 11/2016 | McCoy et al. | |
| 2016/0342978 A1 | 11/2016 | Davis et al. | |
| 2016/0342989 A1 | 11/2016 | Davis | |
| 2016/0342994 A1 | 11/2016 | Davis | |
| 2017/0005804 A1 | 1/2017 | Zinder | |
| 2017/0046526 A1* | 2/2017 | Chan | G06Q 20/0655 |
| 2017/0046652 A1 | 2/2017 | Haldenby et al. | |
| 2017/0046664 A1† | 2/2017 | Haldenby et al. | |
| 2017/0046680 A1 | 2/2017 | Crites | |
| 2017/0046693 A1 | 2/2017 | Haldenby et al. | |
| 2017/0046792 A1 | 2/2017 | Haldenby et al. | |
| 2017/0085555 A1 | 3/2017 | Bisikalo et al. | |
| 2017/0091397 A1 | 3/2017 | Shah | |
| 2017/0103167 A1 | 4/2017 | Shah | |
| 2017/0103461 A1 | 4/2017 | Acuña-Rohter et al. | |
| 2017/0116693 A1 | 4/2017 | Rae et al. | |
| 2017/0132621 A1 | 5/2017 | Miller et al. | |
| 2017/0132625 A1 | 5/2017 | Kennedy | |
| 2017/0132626 A1* | 5/2017 | Kennedy | G06Q 20/401 |
| 2017/0132630 A1 | 5/2017 | Castinado et al. | |
| 2017/0140375 A1* | 5/2017 | Kunstel | G06Q 20/40 |
| 2017/0140394 A1 | 5/2017 | Cao et al. | |
| 2017/0142024 A1 | 5/2017 | Fromentoux et al. | |
| 2017/0149796 A1 | 5/2017 | Gvili | |
| 2017/0155515 A1 | 6/2017 | Androulaki et al. | |
| 2017/0163733 A1 | 6/2017 | Grefen et al. | |
| 2017/0177855 A1 | 6/2017 | Costa Faidella et al. | |
| 2017/0178131 A1 | 6/2017 | Fernandez et al. | |
| 2017/0178237 A1 | 6/2017 | Wong | |
| 2017/0180134 A1 | 6/2017 | King | |
| 2017/0200137 A1 | 7/2017 | Vilmont | |
| 2017/0213209 A1* | 7/2017 | Dillenberger | G06Q 20/3829 |
| 2017/0214675 A1 | 7/2017 | Johnsrud et al. | |
| 2017/0214698 A1 | 7/2017 | Hughes et al. | |
| 2017/0220998 A1 | 8/2017 | Horn et al. | |
| 2017/0221052 A1 | 8/2017 | Sheng et al. | |
| 2017/0223005 A1 | 8/2017 | Birgisson et al. | |
| 2017/0228447 A1 | 8/2017 | Catania et al. | |
| 2017/0230378 A1 | 8/2017 | Bliss | |
| 2017/0232300 A1 | 8/2017 | Tran et al. | |
| 2017/0235955 A1 | 8/2017 | Barkan | |
| 2017/0236407 A1 | 8/2017 | Rhoads et al. | |
| 2017/0243020 A1 | 8/2017 | Dhondse et al. | |

OTHER PUBLICATIONS

Brown, "Building a private blockchain on the Ethereum public blockchain" Aug. 2015 http://jonathanpatrick.me/blog/private-on-public (Year: 2015).*

International Search Report and Written Opinion for International Application No. PCT/US2016/061402 completed Dec. 27, 2016.

Tasca. "Digital currencies: Principles, trends, opportunities, and risks." In: Trends, Opportunities, and Risks. Sep. 7, 2015 (Sep. 7, 2015) Retrieved from <https://www.researchgate.net/protile/Paolo_Tasca/publication/290805276 Digital Currencies Principles Trends Opportunities and Risks/links/569bb91e08ae6169e5624552.pif> p. 5, 10, 12, 14.

Lerner. "MAVEPAY a new lightweight payment scheme for peer to peer currency networks." Apr. 17, 2012 (Apr. 17, 2012) Retrieved from <https://pdfs.semanticscholar.org/1185/a26f014678b959876519065c2624458d75b8.pdf>, entire document.

Malahov, Yanislav Georgiev, "BitAlias 1, AKA Usernames for Bitcoin, A New, Simple Naming System for Bitcoin Addresses", retrieved from the Internet:<URL: https://medium.com/bitalias-decentralized-naming-and-identity-service/bitalias-7b66bffed9d8#.ww4r3h4sn> on Mar. 12, 2017; Bringing Crypto to the People, Founder of www.aeternity.com, Jun. 6, 2015, 6 pages.

International Search Report completed on Mar. 12, 2017 and International Written Opinion completed on Mar. 11, 2017 for International application No. PCT/IB 16/01655 dated Apr. 7, 2017.

Bradley Hope et al., "A Bitcoin Technology Gets Nasdaq Test"; May 10, 2015; retrieved from http://www.wsj.com/articles/a-bitcoin-technology-gets-nasdaq-test-1431296886.

(56) References Cited

OTHER PUBLICATIONS

Nathaniel Popper, "Bitcoin Technology Piques Interest on Wall Street"; Aug. 28, 2015 retrieved from http://www.nytimes.com/2015/08/31/business/dealbook/bitcoin-techno, Aug. 31, 2015.

Joseph C. Guagliardo et al., "Blockchain: Preparing for Disruption Like It's the '90s"; Mar. 14, 2016, retrieved from http://www.1aw360.com/articles/77120CVprint?section=ip.

Robert McMillian, "IBM Bets on Bitcoin Ledger"; Feb. 16, 2016, retrieved from http://www.wsj.com/articles/ibm-bets-on-bitcoin-ledger-1455598864.

Richard Lee Twesige, "A simple explanation of Bitcoin and Blockchain technology"; Jan. 2015, retrieved from http://www.researchgate.net/profile/Richard_Twesige/publication/270287317_Bitcoin_A_simple_explanation_of_Bitcoin_and_Block_Chain_technology_JANUARY_2015_RICHARD_LEE_TWESIGE/links/54a7836f0cf267bdb90a0ee6.pdf.

Provisional Application filed Dec. 10, 2015 by Arjomand et al., "Attributable Digital Currency"; cited on Nov. 21, 2017 in U.S. Appl. No. 15/049,777.

\* cited by examiner
† cited by third party

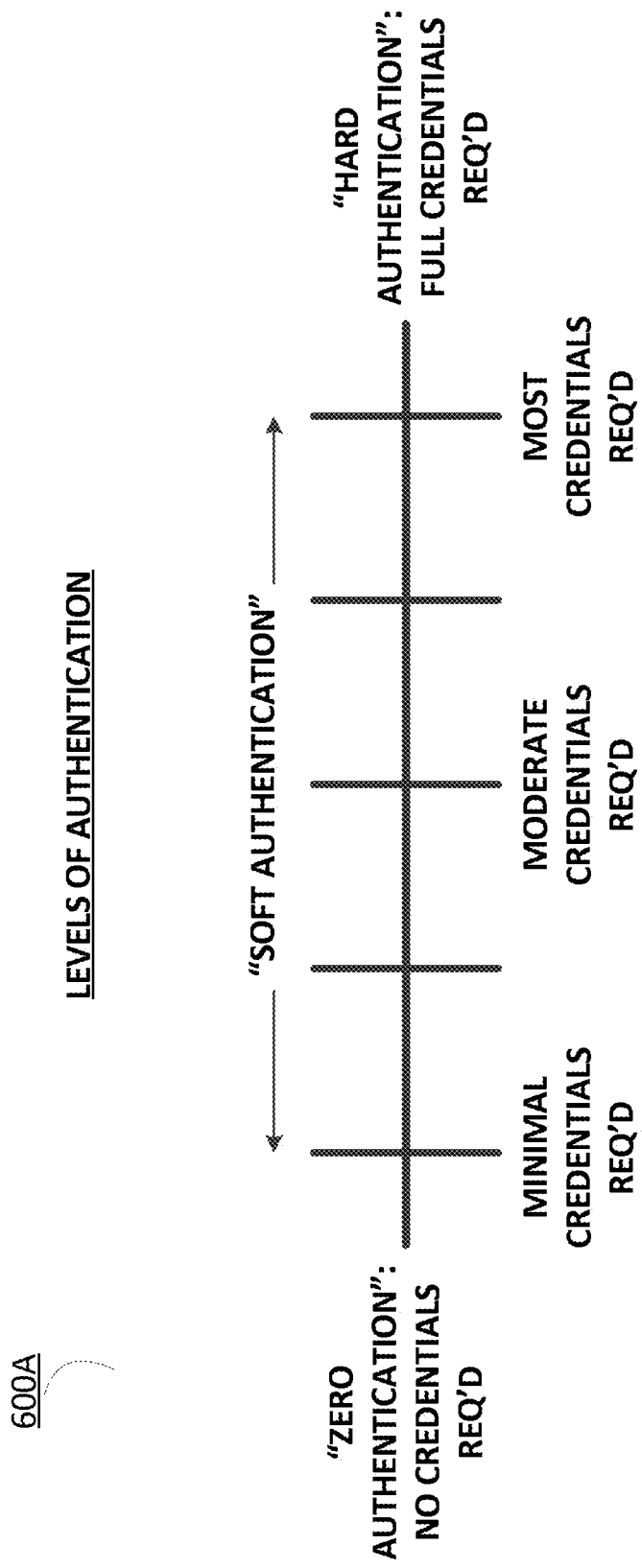

SYSTEM FOR CONTROL OF SECURE ACCESS AND COMMUNICATION WITH DIFFERENT PROCESS DATA NETWORKS WITH SEPARATE SECURITY FEATURES

CLAIM OF PRIORITY UNDER 35 U.S.C. § 119

The present Application for a Patent claims priority to U.S. Provisional Patent Application Ser. No. 62/293,620 entitled "System for Centralized Control of Secure Access to Process Data Network" filed on Feb. 10, 2016 and assigned to the assignees hereof and hereby expressly incorporated by reference herein.

FIELD

The present invention relates to utilizing centralized control over a private block chain for processing actions. More particularly, the present invention relates to using one or more of a private block chain, public block chain, and/or hybrid private and public block chain in order to control secure access to at least the private portions of the one or more block chains, or information therein, by issuing authentication credentials internally and/or externally and/or placing limits on the actions that may be taken within the one or more block chains, and in order to use private and public block chains to verify actions.

BACKGROUND

Block chains allow for the transfer of information in a public setting using a distributed ledger on one or more nodes within the block chain. Block chains have been utilized to verify interactions between parties in order to legitimize and create a chain of record for the funds associated with each interaction within the block chain. However, use and application of block chains, as well as new forms of block chains, have been limited.

BRIEF SUMMARY

Embodiments of the present invention address these and/or other needs by providing an innovative system, method and computer program product for operatively connecting one or more block chains with private and/or public portions over a block chain distributed network, and using the block chain distributed network for facilitating the access, viewing, storage, dissemination, validation, and/or the like of actions taken by users on events within the one or more block chains.

The distributed block chain network comprises at least a private block chain portion, and in some cases a public block chain portion that allows users to take actions (e.g., accessing, storing, disseminating, validating, or the like) event information associated with events (e.g., fund exchange, contract signatures, reporting events, or any other type of event). In some aspects of the invention the users may be assigned authentication credentials in order to regulate the users that can access the private block chain portions (e.g., the private block chain, or the private portion of a hybrid block chain). In some aspects, limits (e.g., rules, or the like) may be placed on the users, nodes, entities associated with the nodes or users, actions taken within the block chain, events associated with the actions, or the like. The limits may be used in order to set up and control the actions various users can take within the block chain, with our without requiring authentication credentials. Moreover, in some aspects of the invention the distributed block chain network with the private block chain portion may be utilized to verify events and separate the private information associated with the events from the public information associated with the events. As such, the present invention provides systems for centralized control of secure access to process data networks by utilizing a private block chain portion; and moreover, provide systems for control of secure access and communication with different process data networks with different security requirements by utilizing one or more block chains with private block chain portions and/or public block chain portions.

Embodiments of the invention relate to systems, methods, and computer products, for supporting and controlling access to a block chain distributed network including a private block chain portion and a public block chain portion through which users take actions on events. Embodiments of the invention include receiving a request from one or more users to access the private block chain portion of the distributed network; receiving a request from the one or more users to take a private action with respect to an event on the private block chain portion, wherein private information associated with the event remains private within the private block chain portion; storing the private information within the private block chain portion; receiving a request from one or more users to take a public action with respect to the event on the public block chain portion, wherein public information associated with the event remains public within the public block chain portion; and storing the public information within the public block chain portion.

In other aspects of the invention, the private information is stored on a private general ledger and the public information is stored on a public general ledger.

In still other aspects of the invention, the private block chain portion is a private block chain and the public block chain portion is a public block chain, wherein the private block chain and the public block chain are separate block chains that are linked together.

In yet other aspects of the invention, the private block chain portion and the public block chain portion are portions of a hybrid block chain.

In further accord with aspects of the invention, the block chain distributed network comprises at least a public block chain network comprising public nodes associated with public users from the one or more users and a private block chain network comprising private nodes associated with private users from the one or more users.

In other aspects of the invention, a single entity controls access to the private block chain network with the private nodes.

In still other aspects, the invention comprises receiving authentication credentials from the one or more users in order to access the private block chain portion; authenticating the one or more users to access the private block chain portion; and allowing the action to proceed when the one or more users are authenticated.

In yet other aspects, the invention comprises receiving limits for the one or more users, one or more nodes, one or more entities, and one or more events or one or more actions associated with the events; comparing the action taken by the one or more users to the limits; and allowing the action to proceed when the limits are met.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
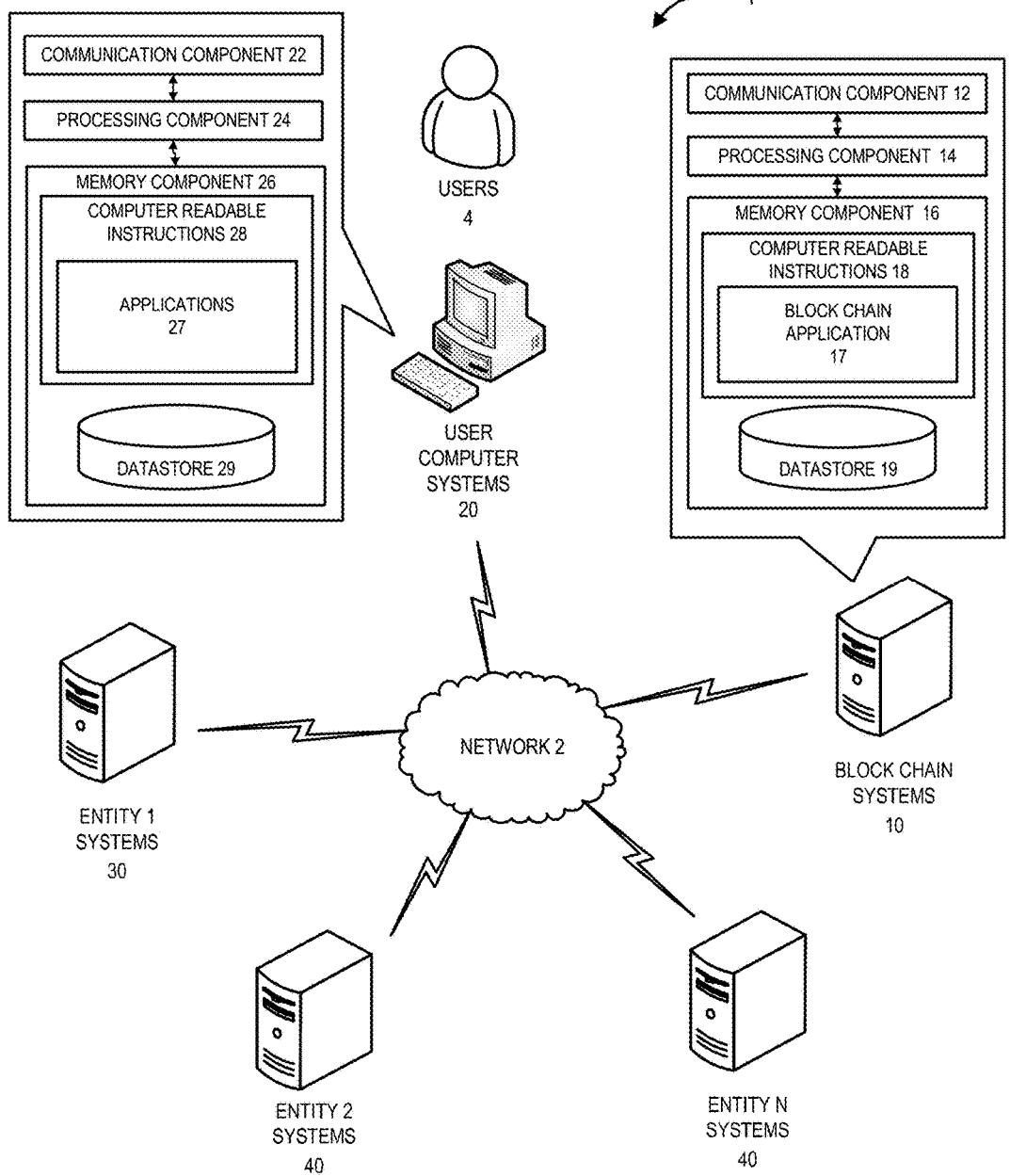
Figure 2:
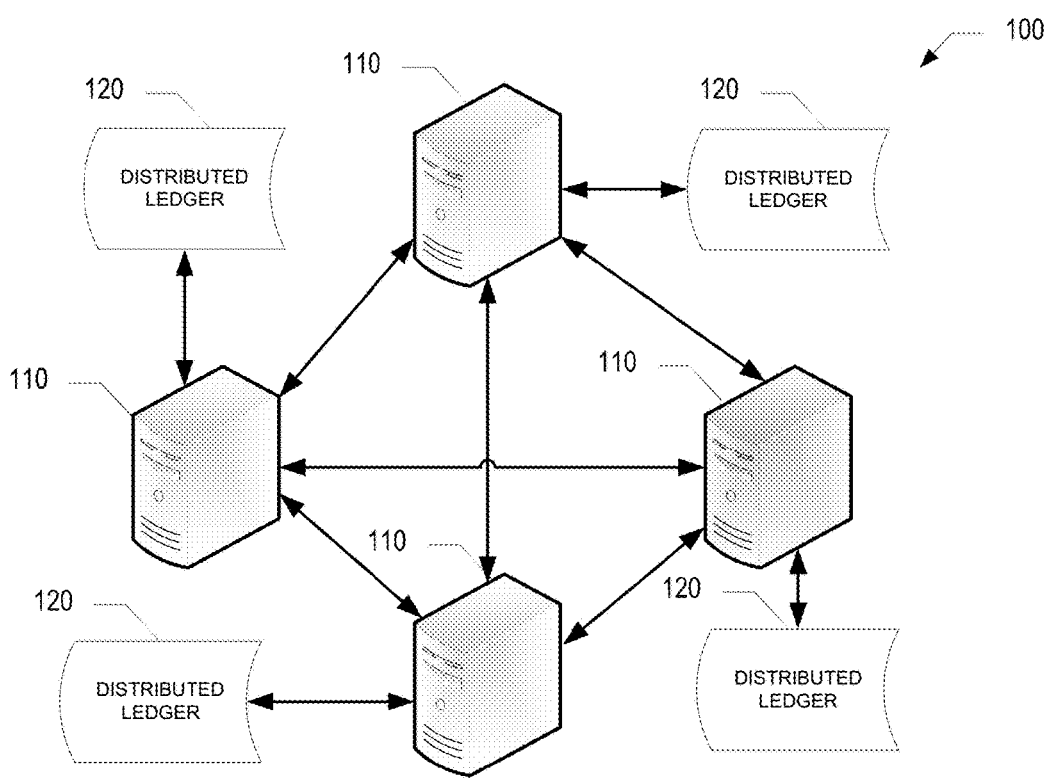
Figure 3:
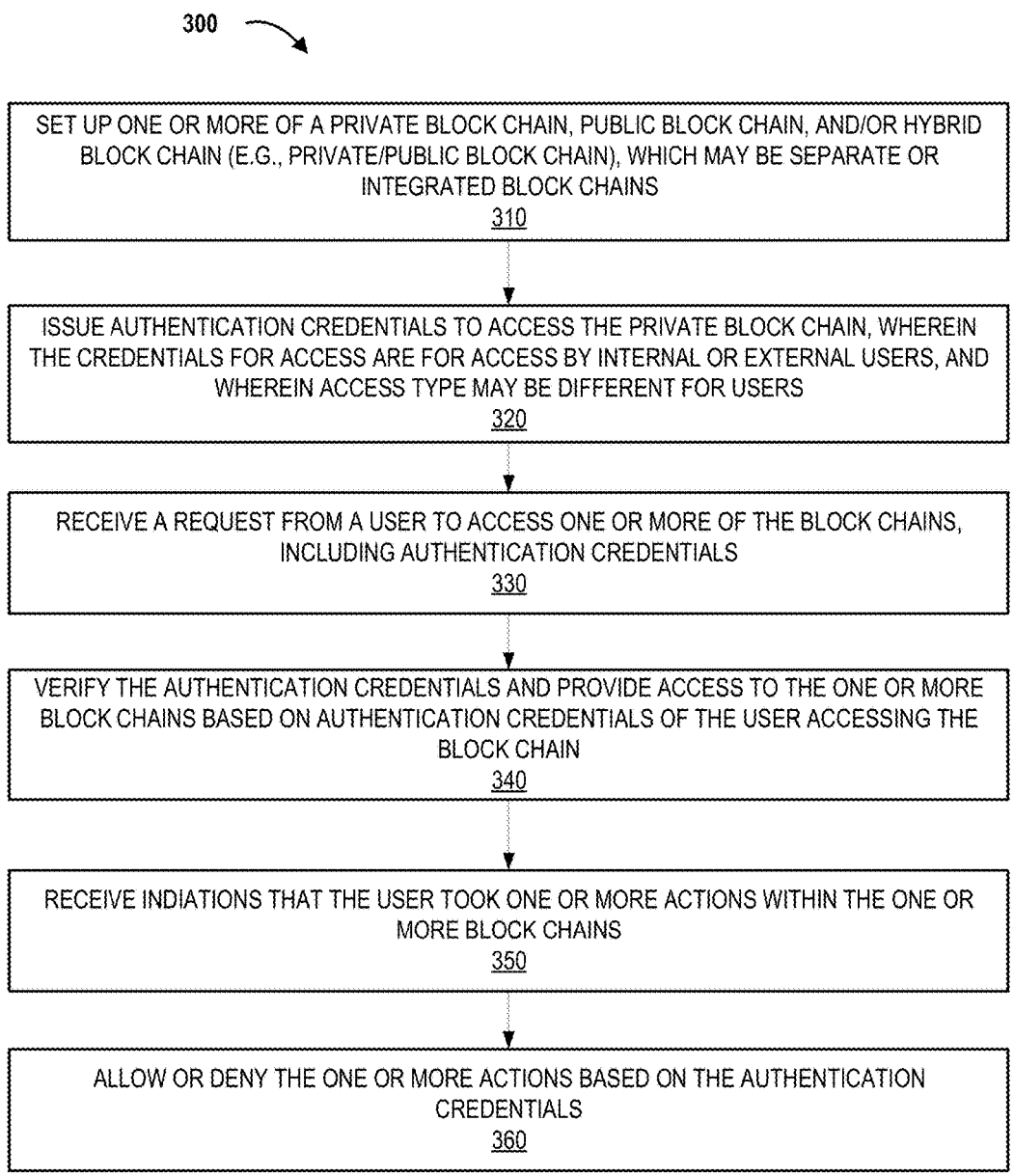
Figure 4:
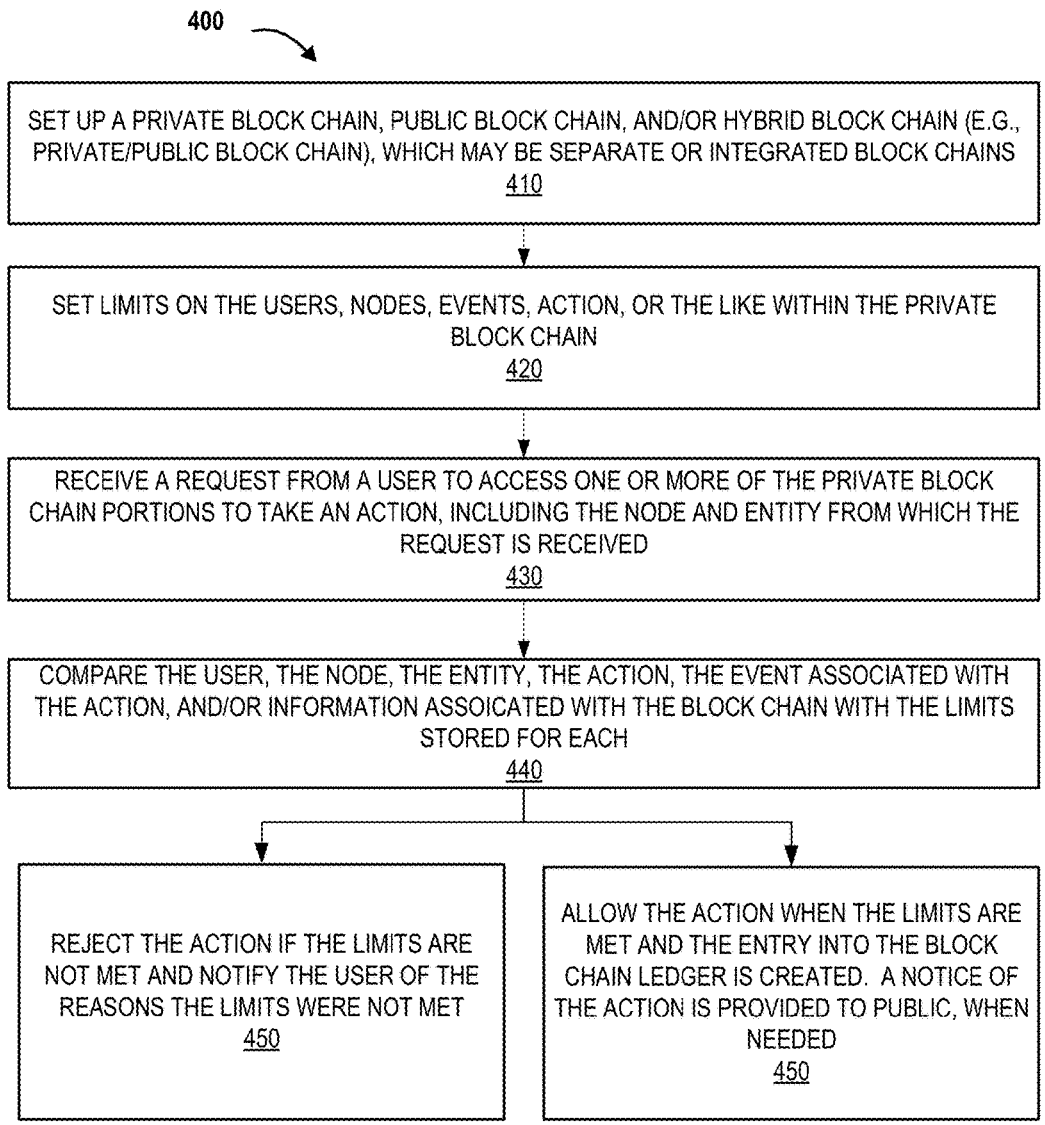
Figure 5:
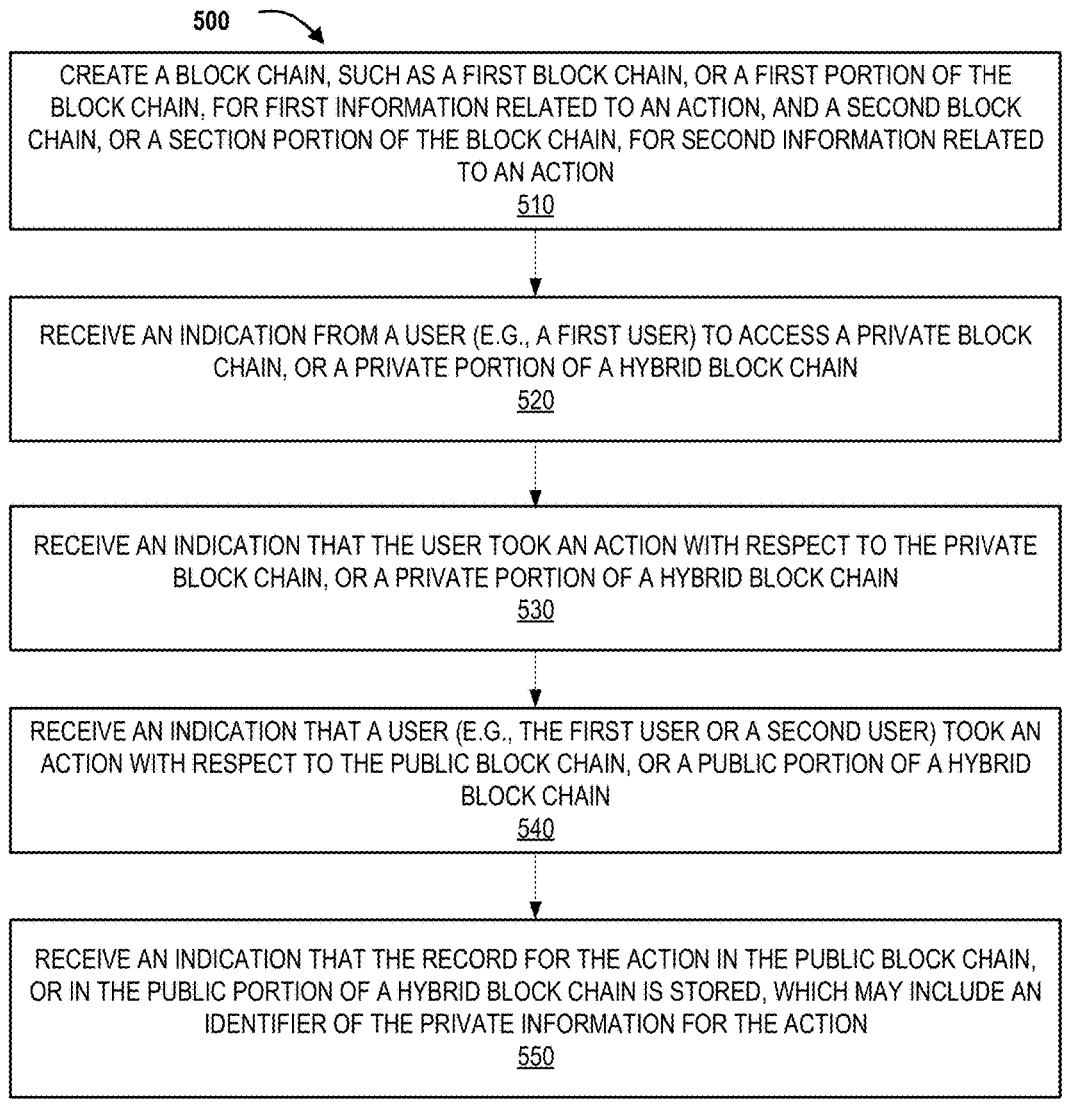
Figure 6B:
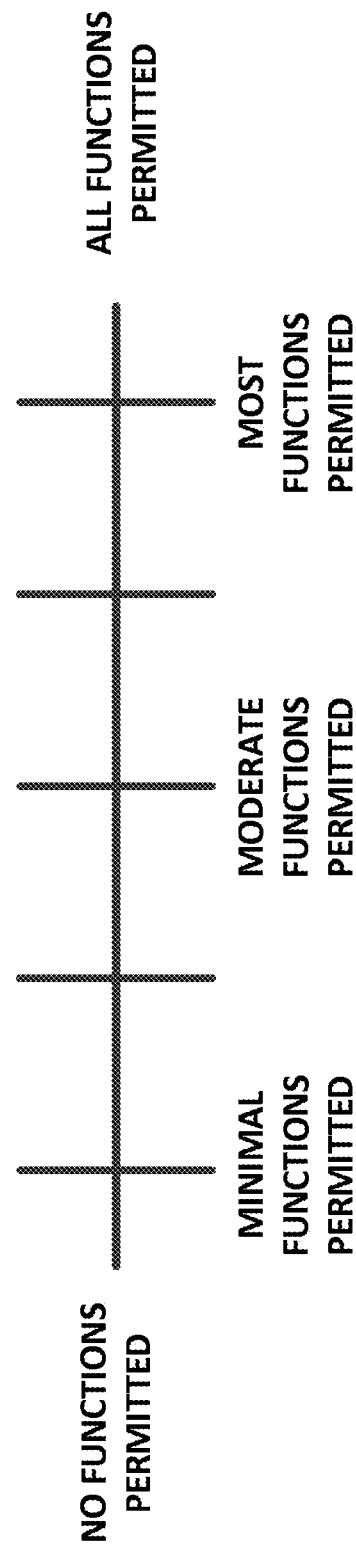
Figure 6C:
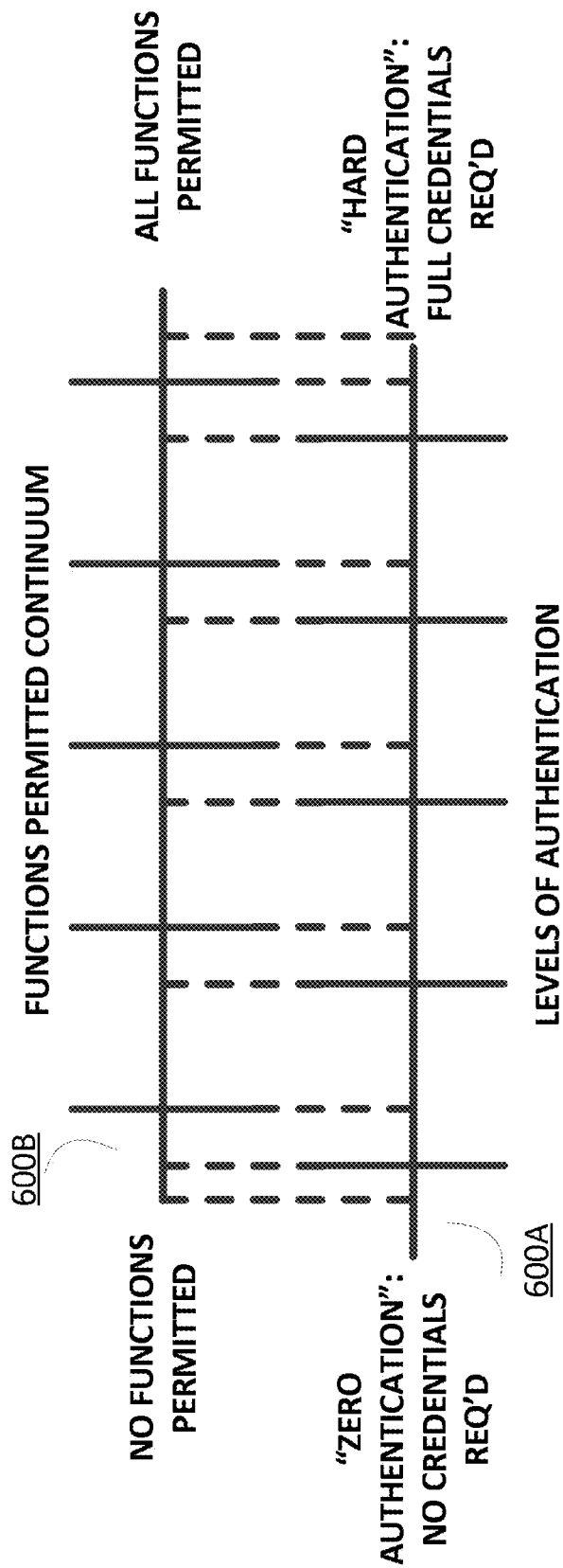
Figure 6D:
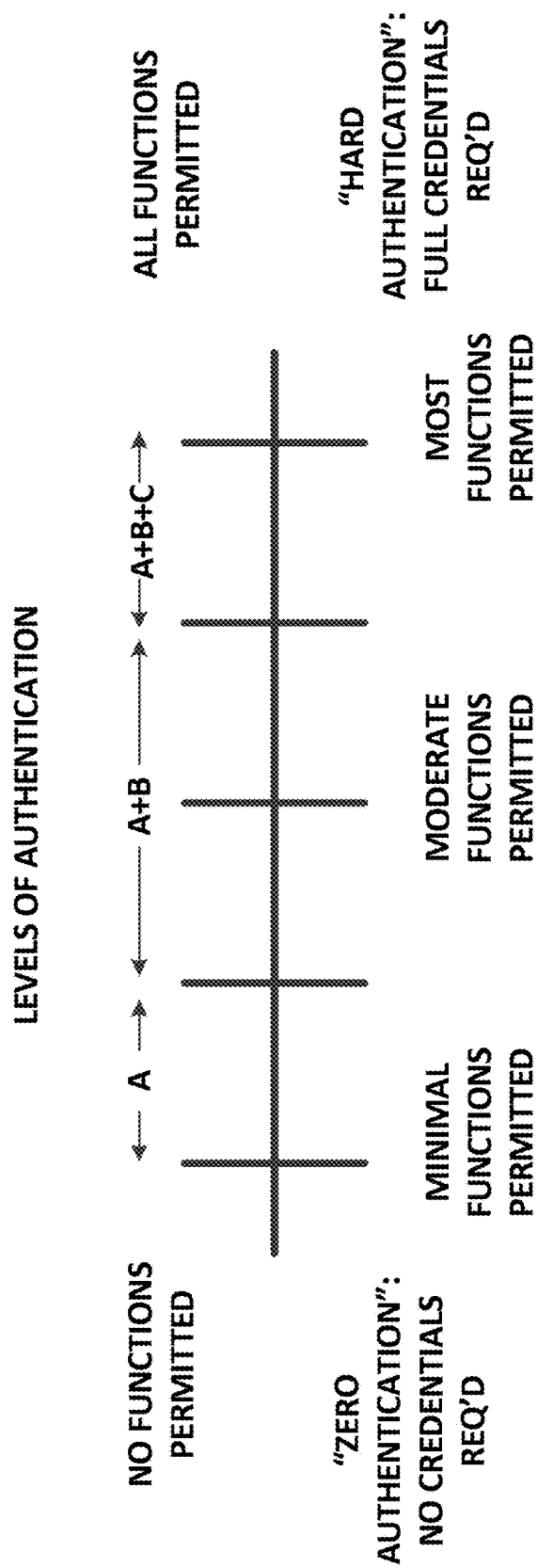

Having thus described embodiments of the invention in general terms, reference will now be made the accompanying drawings, wherein:

FIG. 1 presents a block diagram illustrating a block chain system environment, in accordance with aspects of the invention;

FIG. 2 presents a diagram illustrating a decentralized block chain network configuration, in accordance with aspects of the invention;

FIG. 3 presents a flow diagram for utilizing one or more block chains with private access authentication credentials, in accordance with aspects of the invention;

FIG. 4 presents a flow diagram for utilizing one or more block chains with private access authentication credentials and limits on information utilization within the one or more block chains, in accordance with aspects of the invention;

FIG. 5 presents a flow diagram for utilizing multiple block chains to validate an action for which different information associated with the action is utilized within different block chains, in accordance with aspects of the invention;

FIG. 6A presents an illustration of an authentication continuum in accordance with aspects of the invention;

FIG. 6B presents an illustration of the application functions permitted continuum in accordance with aspects of the invention;

FIG. 6C presents an illustration of the coupling of the application functions permitted continuum and the levels of authentication continuum in accordance with aspects of the of the invention; and FIG. 6D presents an illustration of the relationship between the functions permitted and the authentication types in accordance with aspects of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Embodiments of the present invention provide utilizing one or more of a private block chain, a public block chain, and/or a hybrid private and public block chain (e.g., a portion of the chain is private and a portion of the chain is public), which may be described herein as generally as a hybrid block chain. The one or more block chains may be used to take and action (e.g., access, create, view, store, disseminate, validate, or the like) event information associated with an event, such as the exchange of funds, but also any type of event information for an event that may occur within or outside of a business. In particular, aspects of the present invention use at least a private block chain, or a portion of a block chain that is private, in order to allow a user to take an action (e.g., access, create, view, store, disseminate, validate, or the like) event information for various purposes. In some instances, a single entity may establish and control the private block chain portion, such that the single entity controls access to the private block chain portion (e.g., a private block chain or a hybrid block chain with a private block chain portion having nodes which are stored within the entity's in-house network or nodes outside of the controlling entity which are only allowed to access the private block chain when the node and/or user is authenticated). In other embodiments, two or more entities may establish and/or control access to the private block chain portion. For example, the private block chain, or the private block chain portion of a hybrid block chain, has various nodes that are stored on two or more entities in-house networks. Alternatively, a single node may be associated with each entity, such that the users within the entity access the entity node in order to access the private block chain portion. The one or more entities controlling access to the private block chain, or hybrid block chain, may issue authentication credentials to users internally within the entity, externally for access by users at other entities, or both in order to allow and control access to the private block chain, or hybrid block chain.

Systems, methods, and computer program products are herein disclosed that provide for the use of a block chain. FIG. 1 illustrates a block chain system environment 1, in accordance with embodiments of the invention. As illustrated in FIG. 1, one or more block chain systems 10 are operatively coupled, via a network 2, to one or more user computer systems 20, entity 1 systems 30, entity 2 systems 40, entity $N^{th}$ systems 50 (e.g., any number of other entity systems), or other like systems. In this way, the user 4 (e.g., one or more associates, employees, agents, contractors, sub-contractors, third-party representatives, or the like) within the entities may access a block chain through the one or more block chain systems 10 and/or entity systems 20, 30, 40 within the block chain system environment 1. As such, the users 4 may utilize the user computer systems 20 to take actions with respect to the one or more block chains (e.g., private, public, and/or hybrid block chain). It should be understood that a block chain or general ledger associated with a block chain, or a portion thereof, may be located on each user's computer system 20, one or more entity systems 30, 40, 50, or through one or more block chain systems 10 (e.g., private block chain systems or public block chain systems), all of which may be described as nodes (explained in further detail with respect to FIG. 2) which are used to store information related to the events, such as on a single ledger or a distributed ledger located on various nodes. The leger may be public, private, and/or have ledger portions that are private and other ledger portions that are public.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the block chain systems 10 generally comprise one or more communication components 12, one or more processing components 14, and one or more memory components 16. The one or more processing components 14 are operatively coupled to the one or more communication components 12 and the one or more memory components 16. As used herein, the term "processing component" or "processor" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the user computer systems 20, the entity 1 systems 30, the entity 2 systems 40, the entity $N^{th}$ systems 50, or other like systems. As such, the one or more communication components 12 generally comprise a wireless transceiver, modem, server, electrical connection, electrical circuit, or other component for electronically communicating with other components on the network 2. The one or more communication components 12 may further include an interface that accepts one or more network interface cards, ports for connection of network components, Universal Serial Bus (USB) connectors and the like.

As further illustrated in FIG. 1, the block chain systems 10 comprise computer-readable instructions 18 stored in the memory component 16, which in one embodiment includes the computer-readable instructions 18 of the block chain application 17. In some embodiments, the one or more memory components 16 include one or more data stores 19 for storing data related to the block chain systems 10, including, but not limited to, data created, accessed, and/or used by the block chain application 17.

It should be understood that the block chain systems 10, and the components therein, may be one or more private block chains, one or more public block chains, and/or one or more hybrid block chains. As explained in further detail later the block chain systems 10 may be located in or associated with the other systems described herein.

As illustrated in FIG. 1, users 4 may access the block chain application 17 on the one or more block chain systems 10, or a portion thereof stored on other systems (e.g., a portion of the block chain application 17 stored on the user computer systems 20 or entity systems 30, 40, 50), or through other applications, through a user computer system 20. The user computer system 20 may be a desktop, laptop, tablet, mobile device (e.g., smartphone device, or other mobile device), or any other type of computer that generally comprises one or more communication components 22, one or more processing components 24, and one or more memory components 26.

The one or more processing components 24 are operatively coupled to the one or more communication components 22, and the one or more memory components 26. The one or more processing components 24 use the one or more communication components 22 to communicate with the network 2 and other components on the network 2, such as, but not limited to, the block chain systems 10, the entity 1 systems 30, the entity 2 systems 40, the entity $N^{th}$ systems 50, or other systems. As such, the one or more communication components 22 generally comprise a wireless transceiver, modem, server, electrical connection, or other component for electronically communicating with other components on the network 2. The one or more communication components 12 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with the users 4.

As illustrated in FIG. 1, the user computer systems 20 may have computer-readable instructions 28 stored in the one or more memory components 26, which in one embodiment includes the computer-readable instructions 28 of applications 27, such as dedicated applications (e.g., apps, applet, or the like), portions of dedicated applications, web browser or other apps that allow access to applications located on other systems, or the like. As previously discussed, the block chain application 17, or a portion thereof, may be stored on each of the user computer systems 20.

As illustrated in FIG. 1, the entity 1 systems 30, the entity 2 systems 40, the entity $N^{th}$ systems 50, or other systems are operatively coupled to the block chain systems 10 and/or user computer systems 20, through the network 2. These systems have components that are the same as or similar to the components described with respect to the block chain systems 10 and/or user computer systems 20 (e.g., one or more communication components, one or more processing components, and one or more memory devices with computer-readable instructions of one or more applications, one or more datastores, or the like). Thus, the entity 1 systems 30, the entity 2 systems 40, the entity $N^{th}$ systems 50, or other systems communicate with the block chain systems 10, the user computer systems 20, and/or each other in same or similar way as previously described with respect to the block chain systems 10 and/or the user computer systems 20. The entity systems 30, 40, 50 may be made up of one or more user systems 20, one or more of the block chain systems 10, or other entity systems that act as nodes (explained in further detail with respect to FIG. 2) which are utilized to store, disseminate, and/or validate event information for events within the block chain. It should be further understood that the block chain systems 10 may be separate systems and/or a part of each user computer system 20, and/or entity systems 30, 40, 50.

FIG. 2 provides a block chain system diagram, illustrating how a block chain operates. Rather than utilizing a centralized database to access, view, store, disseminate, and/or validate information, the present invention utilizes a decentralized block chain configuration or architecture, as shown in FIG. 2 in one aspect of the invention, in order to allow users to access, view, store, disseminate, and/or validate information, or take another action related to an event. Such a decentralized block chain configuration ensures accurate mapping and validation of event information, and provides a secured network over which information may be validated. Accordingly, block chain configurations may be utilized with respect to any type of information, such as, but not limited to maintaining an accurate ledger of information, such as resource transfer information (e.g., transaction, asset transfer, sale, or other like transfer of value information), personal information, credit history information, or the like, in order to provide validation, such as validation of resource transfers, or access to personal information, or the like.

A block chain (otherwise described herein as a "blockchain") is a distributed database that maintains a list of data records, the security of which is enhanced by the distributed nature of the block chain. A block chain typically includes several nodes, which may be one or more entities, systems within an entity, machines, computers, databases, data stores, or the like operably connected with one another. For example, the various systems described with respect to FIG. 1, or systems within the systems described with respect to FIG. 1 may be nodes. In some aspects of the invention, an entity may be a node of a block chain, and internal or external users 4 may access the entity systems in order to take actions with respect to an event. In other aspects of the invention various systems within an entity may be nodes, which may or may not be grouped together and associated with the entity. In other aspects of the invention, each of the nodes or multiple nodes are maintained by different entities, or components within an entity, and as such different systems within an entity or between entities may act as nodes. A block chain typically works without a central repository or single administrator, however, as discussed in the present invention a network of nodes within a single entity or group of entities may together serve as a central repository or single administrator that can control access to the block chain that is associated with a plurality of different nodes. One application of a block chain is the public ledger of resource transfers for cryptocurrencies, such as used in bitcoin. In this use of a block chain, the data records recorded in the block chain are enforced cryptographically and stored on the nodes of the block chain.

A block chain provides numerous advantages over traditional databases. For example, with respect to utilizing a block chain for resource transfer information, a large number of nodes of a block chain may reach a consensus regarding the validity of a resource transfer contained on a decentralized resource transfer ledger. Similarly, when multiple versions of a document or resource transfer exits on the ledger, multiple nodes can converge on the most up-to-date version of the resource transfer. For example, in the case of a virtual currency resource transfer, any node within the block chain that stores or validates the resource transfer, can determine within a level of certainty whether the resource transfer can take place and become final by confirming that no conflicting resource transfers (i.e., the same currency unit has not already been spent) are confirmed by the block chain elsewhere on other nodes.

The block chain typically has two primary types of records. The first type is the event type (e.g., resource transfer type, document type, or the like), which consists of the actual data stored in the block chain. The second type is the block type, which are records that confirm when and in what sequence certain events (e.g., resource transfers, or the like) became recorded as part of the block chain. Events (e.g., resource transfers, or the like) are created by participants using the block chain in its normal course of business, for example, when someone sends cryptocurrency to another person), blocks are created by users known as "miners" who use specialized software/equipment to create the blocks for the event. Users of the block chain create blocks for the events (e.g., resource transfers, or the like), which are passed around to various nodes of the block chain. A "valid" resource transfer is one that can be validated based on a set of rules that are defined by the particular system implementing the block chain. For example, in the case of cryptocurrencies, a valid resource transfer is one that is digitally signed, spent from a valid digital wallet and, in some cases, meets other criteria. In some block chain systems, miners are incentivized to create blocks by a reward structure that offers a pre-defined per-block reward and/or payments offered within the resource transfers validated themselves. Thus, when a miner successfully validates a resource transfer on the block chain, the miner may receive rewards and/or payments as an incentive to continue creating new blocks.

As mentioned above and referring to FIG. 2, a block chain 100 is typically decentralized-meaning that a distributed ledger 120 (i.e., a decentralized ledger) is maintained on multiple nodes 110 of the block chain 100. One node in the block chain may have a complete or partial copy of the entire ledger or set of events (e.g., resource transfers, or the like) and/or blocks on the block chain. Events (e.g., resource transfers, or the like) are initiated at a node of a block chain and communicated to the various other nodes of the block chain. Any of the nodes, or users of the nodes, which have access to the block chain to validate an event, add the event to its copy of the block chain, and/or broadcast the event (e.g., resource transfer or the like) its validation (in the form of a block) and/or other data to other nodes. This other data may include time-stamping, such as is used in cryptocurrency block chains.

Various other specific-purpose implementations of block chains may be developed. These include distributed domain name management, decentralized crowd-funding, contract execution, analyst reporting, financial reporting, synchronous/asynchronous communication, decentralized real-time ride sharing, controlling access to or dissemination of timeline, personal, and/or financial data (e.g., a credit report, or the like) and even a general purpose deployment of decentralized applications. As such, block chains may be utilized to access, view, store, create, disseminate, and/or validate any type of event information, or take any other type of action with respect to event information associated with an event.

In various aspects, the block chain may be configured with a set of rules (otherwise described herein as "limits") to dictate what actions may be taken by users and/or nodes for various events, how information may be accessed, created, stored, disseminated, and/or validated, and/or how the network communicates information throughout the one or more block chains across the nodes of various entities associated with the nodes (e.g., supports the nodes on the entity systems). In some aspects, the rules dictate that an originating node (i.e., a node through which a resource transfer was initiated) must approve all actions for events mapped to that node. In some aspects, the rules dictate that some or all actions for events may be approved by one or more validator nodes without further input from the originating node. In some such cases, the rules dictate that additional information is needed in determining whether an action for an event should be approved. In other aspects, the validating node must reach out to the originating node in certain situations as dictated by the rules. For example, if the action for the event, such as validating a resource transfer, is in any way, indicated to be a faulty or invalid (due to some information present on the block chain), then the rules may dictate that the validating node communicate with the originating node to confirm or deny validation of the event.

In some aspects, the validator may approve the event (e.g., resource transfer, or the like) without communicating with the originating node. In such a case, the validator (or a group or all of validators if multiple or universal validations, respectively, are required by the rules), can approve the action for the event based solely on the information contained in the block chain. Thus, if an action for an event is requested and a validator receives the action for the event, it can check the actions for the event against its ledger to determine whether an originating node has validated the event. If so, then the validator may approve the action for the event. In this regard, the action for the event may be approved very quickly, and in some cases, in real-time or near real-time.

In various aspects, any of the nodes 110 illustrated in FIG. 2, may be a validator or a miner that validates events (e.g., resource transfers, or the like). In some aspects, a number of the nodes 110 must validate an event (e.g., resource transfer, or the like) in order for the event to be approved. For example, in one embodiment, two or three nodes 110 must validate the authenticity of the event, or portions thereof, before the event may be approved. As noted above, in some instances, the rules of the block chain and/or rules specific to particular originating entities or validators dictate that validators cannot approve events without confirming available information (e.g., funds used in a resource transfer). In some cases, the available information is already associated with an alias on the public block chain, or associated with a customer within an entity controlling a private block chain, but in other cases, the validator on the block chain must communicate with the originating entity in order to request approval of the event (e.g., resource transfer, or the like).

In some aspects, the rules may only be changed by the originating node (maintained by an originating entity or entities that control the block chain) to ensure the validity of a change to a rule. In some cases, particularly in cases where one or more nodes have raised a concern that an event is not valid, the originating node may be contacted for verification of the event.

In various aspects, the event, or information for the event, is stored and executed from one or more systems and is not placed on the public block chain itself, and instead is located on a private portion of the block chain. In some aspects, the event, or information for the event, is only stored and executed from a subset of the nodes of the block chain, which, in some aspects, are synonymous with validator nodes and in other aspects are not synonymous with the validator nodes. In some aspects, placeholder(s) for the event (e.g., resource transfers, or the like) indicating that the event exists and/or a description of the event, is accessible from private block chains and may be placed on the public block chain. The placeholder(s) may be identifiers (e.g., characters, or the like) and/or a description of the event. In some cases, the event may be executed only by the designated one or more systems (e.g., on the private block chain, or on a private portion of a block chain). Such systems may utilize a key or other security mechanism(s) in order to ensure only certain nodes are allowed access to the information related to the private block chain portion. In some cases, this configuration may result in additional security instead of placing the event on the public block chain for any node to execute.

FIG. 3 presents a flow diagram for a utilizing a private, public, and/or hybrid block chain, in accordance with aspects of the invention. In some aspects of the invention, one or more of a private block chain, public block chain, and/or a hybrid block chain may be set up, as illustrated in block 310. In one aspect of the invention, the private block chain may be hosted on the systems of a single entity, such as entity 1. In this way, the private block chain systems, or private portions of the block chain systems 10 may be controlled by a single entity. The single entity (e.g., entity 1) would thus control who (e.g., what entities, nodes, and/or users 4 within the entities) would be able to take an action (e.g., access, view, create, store, disseminate, and/or verify) for events (e.g., resource transfer, contract, analysis report, financial report, communication, retrieve document information, or the like) using the private block chain systems 10. In other aspects of the invention, multiple entities may host the private block chain, and thus, control the block chain systems 10 and who can take actions (e.g., access, view, create, store, disseminate, and/or verify) on an event using the private block chain systems 10. It should be understood that controlling the access to the private block chain portions improves upon the security of the actions taken with respect to the events because the access to the private block chain is limited in addition to the security provided by utilizing the decentralized ledger of a block chain for the events.

In some aspects of the invention, events may be resource transfers, and thus, the private block chain systems 10 may be utilized to validate resource transfers that occur using accounts of the one or more entities, such as but not limited to financial accounts of clients that utilize accounts within a financial institution to enter into resource transfers. As such, these resource transfers may be validated, as previously described herein, using the private block chain, and thereafter the results of the validation may be shared publicly, such as through public block chains, as will be discussed in further detail later. In another aspects of the invention, events may be accessing information from a documents, such as a credit report. The access to different portions of the credit report my included a tiered level of access for which some users may access only credit worthiness, while other users may access credit worthiness and personal information, still others may access worthiness, personal, and financial information, and others may access all information, as will be discussed in further detail later. In other aspects of the invention the events may be any other type of event, such as but not limited, signing and storing documents, storing and disseminating public and private information, or the like, and the actions may be any type of action related to the event.

In another aspect of the invention the public block chain may be utilized as discussed with respect to FIG. 2. As such, in the public block chain there are no restrictions on users or nodes that may be able to take an action (e.g., access, view, create, store, disseminate, and/or validate) on an event. As previously discussed, a public block chain may allow a user to access to a node, or the user may utilize the user computer systems 20 as a node in order to take actions within a public block chain for an event.

Moreover, in other aspects of the invention, a hybrid block chain may be utilized. A hybrid block chain has elements of a private block chain and elements of a public block chain. A hybrid block chain (or a combination of private block chain and public block chain) may be used to record the fact that the event happened, and even that it happened correctly publicly, without exposing confidential details about the subject matter or the parties involved privately. For example, as will be discussed in further detail later an action (e.g., access, create, store, disseminate, and/or validate) may be taken by a user 4 on some information (e.g., a first portion of information) associated with an event using the private portion of the block chain, while actions may be taken by a user 4 (same or different user) on other information (e.g., a second portion of information) associated with an event using a public block chain. As such, some information related to an event may remain private, while other information may remain public, as will be discussed in further detail throughout.

It should be understood that one or more of the block chains may be utilized in order to perform the aspects of this invention either alone or in combination with other block chains. It should be further understood that one or more of these block chains may be stored on the systems of one or more of the entities. For example, the private block chain, or the portion of the hybrid block chain that is private, may be controlled by a single entity. In other aspects of the invention, two or more entities may control access to the private block chain or the portion of the hybrid block chain that is private. Alternatively, the public block chain and/or the portions of the hybrid block chain that are public, may be accessed by any of the entities, including the entity that controls the private block chains.

Block 320 of FIG. 3 illustrates that the one or more entities controlling the private block chain portion (e.g., the private block chain and/or the portions of the hybrid block chain that are private) may create and issue authentication credentials to control access to the private block chain portions. The authentication credentials may be limited to users 4 that are employed by the one or more entities controlling the private portions of the block chain (e.g., internal users), or otherwise may be users 4 of one or more other entities that do not control the private block chain (e.g., external users). In other instances, different users (e.g., different users within each of the one or more entities, different users from outside of the one or more entities, and/or different users between the entities) have different authentication credentials, which allow or prevent the users from taking specific actions on specific events within the block chain systems 10, as will be discussed in further detail with respect to FIG. 4. The authentication credentials may allow one user type to take any action (e.g., access, view, create, store, disseminate, and/or verify) all events (e.g., resource transfers, document access, contracts, analysis reports, documents, or the like), while other users 4 may only be allowed to take one or more types of actions on the events (e.g., only access or only disseminate). In other aspects, the authentication credentials may limit or allow one or more users 4 to take actions on a particular event. For example, one user may access, view, store, disseminate, and/or validate all resource transfers, while other users may only access, view, and disseminate information related to an event. In other aspects of the invention, the authentication credentials may be placed on the nodes from which the users 4 access the block chain, and as such, the nodes may only take specific actions on specific events. Alternatively, both the users and nodes may require authentication credentials.

FIG. 3 illustrates in block 330, that the system controlling the private block chain portion may receive a request from a user 4 to access the private block chain portion and/or an event therein, and/or take another action within the private block chain portion. The request received from the user 4 may include the authentication details of the user 4, node, or both. For example, even before a user 4 can access a node, utilize a node (e.g., save something to a node, create a block for the block chain, access information from a block chain, or the like), access the block chain through a node, and/or access an event in the block chain, the present invention may require the user 4 to provide authentication credentials (e.g., as described in further detail with respect to FIGS. 6A-6D, such as but not limited to providing a user name and/or password). In one example, the user may submit to the block chain a particular action for an event, but the action will not be completed (e.g., create an entry for the block chain) until the user 4 is verified as having the requested authentication to take the action.

Block 340 of FIG. 3, illustrates that the system verifies the authentication credentials of the user 4 and allows the user to access to the block chain and/or take the actions with respect to the event. For example, the user 4 may access a block chain to verify a resource transfer for the financial institution.

Block 350 of FIG. 3 illustrates that an indication is received that the user took an action within the one or more block chains. For example, as previously discussed the user 4 may access, view, create, store, disseminate, and/or validate (or take another action) with respect to an event, such as a resource transfer.

Block 360 of FIG. 3 illustrates that after the indication of the action is received, the action is allowed or denied based on the authentication credentials of the user 4. Once the allowed, a record of the action for the event may be stored in the block chain (e.g., creation of an entry in the block chain to validate the event, dissemination of the event, or the like). Moreover, once the action is allowed, the entry into the block chain may be distributed to the one or more users 4 that have access to the particular block chain. For example, other users 4 may be able to verify the action of the user for the event, access the entry, be pushed a report of the changes, and/or be notified that changes took place to the block chain.

FIG. 4 presents a flow diagram for a utilizing a private, public, and/or hybrid block chain, in accordance with aspects of the invention. As previously discussed with respect to block 310 in FIG. 3, a public, a private, and/or a hybrid block chain may be set up, as illustrated in block 410 of FIG. 4. As previously discussed these block chains may be related (e.g., tied to each other) or may be separate (e.g., separate from each other, but able to communicate with each other using an electronic link). In this aspect of the invention at least the hybrid block chain, and/or a combination of a private and public block chain is utilized, such that there is at least a private block chain portion and a public block chain portion utilized.

Block 420 of FIG. 4 illustrates that limits (e.g., a type of rule) may be set on the user 4, nodes, events, and/or actions taken by users 4 accessing the private block chain, the public block chain, and/or the hybrid block chain. In some aspects, the limits may be set up based on the users 4, the nodes associated with the users 4, and/or both the nodes and/or users 4. For example, the one or more nodes associated with an entity that is responsible for controlling the private block chain portions (e.g., a private block chain, or the private portion of a hybrid block chain) may be allowed to take actions with respect to an event on the private block chain portions, while one or more nodes outside of the entity controlling the private portions of the block chain may only access certain aspects of the private block chain portions and the public block chain portions (e.g., a public block chain or the public portions of the hybrid block chain). In still other examples, the users 4 within an entity may use any of the nodes but may be limited to what type of actions the users 4 may take on the nodes. In additional examples, the users 4 may be limited not by the type of user and not based on nodes internal or external to the one or more entities controlling the private block chain portion, but based on entities (or the one or more nodes controlled by an entity) with which the user 4 is employed or affiliated. In other aspects of the invention the limits may be placed on particular actions and/or particular events. For example, some types of events (e.g., resource transfers under a value X)

may require validation by a single user 4, while other types of events (e.g., resource transfers over a value X) may require validation by multiple users 4. In other examples, particular types of information (e.g., resource transfer price or parties) associated with an event may be created, stored, and validated, but other types of information (e.g., the existence of the completed resource transfer) associated with an event may be disseminated).

In one aspect of the invention, block 430 of FIG. 4 illustrates that a request is received from a user to take an action on an event within on one or more of the block chains, such as the private block chain portions. The user 4 may be identified by authentication credentials, which may identify the user 4, or be an alias of the user 4. Moreover, the node through which the user 4 is accessing the one or more block chains is identified, along with the entity associated with nodes. The request may also include the action the user is taking, the event associated with the action, and/or information associated with the block chain.

As illustrated by block 440 of FIG. 4, the systems (e.g., block chain systems 10, the entity systems 30, 40, 50) compares the user 4, the node, the entity that controls the node, the action, the event associated with the action, and/or information associated with the block chain with the limits stored for each to determine whether or not to allow the action.

Block 450 of FIG. 4 illustrates that if the limits are not met the action is rejected and the user 4 is notified of the reason the action is rejected. Block 460 of FIG. 4 illustrates that if the limits are met the action is allowed and the block chain is created as requested. Thereafter, the action may be provided to one or more other users 4 for one or more other entities. For example, the action may be shared as needed with other users 4 and/or the public based on the action taken by the user 4, the authentication credentials of the other users 4, and/or the limits on the other users 4, the nodes, entities, or the like, through which the other users 4 are accessing the one or more block chains.

FIG. 5 presents a flow diagram for utilizing multiple block chains in a specific way to validate an event for which different information associated with the event is utilized within different block chains, in accordance with aspects of the invention. Block 510 in FIG. 5 illustrates that a block chain, or portion thereof, may be created for first information associated with a particular event, while a second block chain, or a second portion of the first block chain, may be created for second information associated with the event. In one example, the event may be a resource transfer. The first block chain, or first portion of a hybrid block chain, may be private, and as such, first information associated with the private portion of the block chain may be related to private portions of the resource transfer, such as but not limited to, account numbers, the value of the resource transfer, the user name, the article being purchased, the name of the merchant, or the like. Alternatively, the second block chain, or a second portion of a hybrid block chain, may be related to public portions of the resource transfer, such as but not limited to, the funds used in the resource transfer, an alias account number (e.g., token account number, or placeholder account identifier, or the like), an alias user name, an alias of the merchant, an amount of the resource transfer (or representation thereof), confirmation of the resource transfer, and/or other like information that may be used to verify the resource transfer publicly across one or more block chains.

FIG. 5 illustrates in block 520 that the user 4 may access the private block chain using authentication credentials, as previously discussed herein, with respect to FIG. 3. In other aspects of the invention, the user 4 may request an action through a node, and the request is compared to limits on the user, node, action, event, information associated with the event, or the like, as discussed with respect to FIG. 4.

As illustrated in block 530, the system receives an indication that the user took an action (e.g., access, view, create, store, disseminate, validate, or the like) for an event within the private block chain, or portion of the hybrid block chain that is private. When one or more users 4 have taken an action within the private block chain, as previously described herein, the private block chain may issue an action authentication for the action, which may illustrate that the private information related to the action is completed within the private block chain, or within the private portion of the hybrid block chain. The action authentication may be a notification, an identifier, an identification key, or the like that may be published and/or used by the one or more public users 4 in the public block chain, or in the portion of the hybrid block chain that is public. For example, returning to the example of a resource transfer, a private user 4 may be authorized to utilize the private block chain portion (e.g., a private block chain or a private portion of hybrid block chain) for validating a resource transfer. For example, the user 4 may validate the private information associated with the resource transfer, such as the real names of the parties, amounts associated with the resource transfer, account numbers associated with the resource transfer. In response, the system may provide a resource transfer authentication that verifies that the resource transfer is, in fact, legitimate. The resource transfer authentication may be presented to the public for additional actions.

Block 540 of FIG. 5 illustrates that one or more users (e.g., the same user that took the action with respect to the private portion of the action, or a different user) will use the action authentication from the private block chain (or portion thereof) to further take an action with respect to the event. For example, returning to the example regarding the resource transfer, the one or more public users 4 may either finalize validation of the event by validating the public information associated with the resource transfer (e.g., create a general ledger entry with the action authentication indicating that the resource transfer that occurred is valid). Alternatively, the one or more users may take the authentication action associated with the event, and take another action to provide the public details on the public block chain (e.g., create a general ledger entry with the action authentication and other public information, such as alias names and description of the resource transfer indicating that the resource transfer that occurred is valid). As previously discussed, the same user may take both the private actions and the public actions, for example in order to validate the resource transfer.

Block 550 of FIG. 5, illustrates that the record for the public block chain is stored, which may include the validation indicator for the private portion of the block chain that was validated by the one or more users 4.

Alternatively, the two portions of information associated with the event may be stored on two private block chains. For example, with respect to a resource transfer, a first user may validate a first portion of information associated with the resource transfer on a first private block chain portion, while a second user validates a second portion of information associated with the resource transfer on a second private block chain portion.

In other examples of the invention, the one or more block chains may be utilized for events such as to formalize agreements. For example, the first block chain, or a first portion of a hybrid block chain may be private, and parts of the contract may include information to remain confidential, such as but not limited to the true name of the parties, the goods or services in the contract, the amount associated with the contract, account numbers for fund transfers, electronic signatures, or other terms and conditions of the contract. Alternatively, the second block chain, or a second portion of a hybrid block chain may be related to public portions of the contract, such as but not limited to, the verification that both parties agreed to the contract (e.g., identifiers for the electronic signatures, or the like), alias names of the signatories, alias names, party alias, account numbers aliases, or the like. In other embodiments, the contracts may be title documents, deeds, execution of wills, notary confirmations, or the like. In other examples, the execution of a contract and a checklist regarding the obligations of the contract may be stored on two separate private block chains (e.g., one for each party of the contract) in order to validate privately that both entities are complying with the contract.

In another example of the invention, the one or more block chains may be utilized for determining access to information in a credit report of a person. For example, the credit report of the user may be stored in various block chains, or access to different portions (e.g., multiple private or public block chains) may be restricted based on the user 4. For example, when applying for a rental application a landlord may be able to access a person's credit worthiness and the various places the person has lived from the credit report, but not other information, such as account information. However, when applying for a credit card, the credit card company may have access to the person's credit worthiness and account information. Finally, when applying for a home mortgage, the mortgage company may be certified and/or authenticated to access all of the credit report. In this way, access to a person's credit report may be more secure. Moreover, the information related to the private portions of the credit reports may be stored and controlled through one or more private block chains. As such, different levels of authentication may be utilized to access the different credit report information within a single private block chain, or in other aspects of the invention multiple private block chains (or portions thereof) may be used to store and/or access the different credit report information (e.g., $1^{st}$ information stored in first block chain, $2^{nd}$ information stored in second block chain, $N^{th}$ information stored in $N^{th}$ block chain associated with the event that required information from the credit report). It should also be understood that the public block chain (or portions thereof) may be used to make public information related to the event public in order to validate the occurrence of the event, while keeping the credit report information related to the event private.

In other examples of the invention, the one or more block chains may be utilized for events such as storing and disseminating reports, such as analyst reports. In one example, the first block chain, or a first portion of a hybrid block chain may be private, and parts of the reports may include information that should remain confidential, such as calculations, confidential financial information, break down of sales or expense information, or other like information that may be utilized to create an analyst report. Alternatively, the second block chain, or a second portion of a hybrid block chain may be related to public portions of reports, such as but not limited to, the public accounting information, public disclosures for expected future expenses, or the like.

The present invention provides improved security and privacy for events by providing a private block chain (or portions thereof), authentication credentials, limits for the private and public block chains, and the use of private portions and public portions of block chains for different event information. These features and the other features discussed herein, give more control over the events that occur on blocks chains in order to regulate the use of the block chains. The present invention allows the one or more entities that control access to the private block chains to vet the users 4, nodes, actions, events, and/or information on the block chain, while still publicly providing verification that the events occurred in order to reduce the chance for misappropriation of the events within the block chain. For example, with respect to resource transfers, the private information associated with resource transfers may maintain private, while the public information may be disseminated in order to verify the occurrence of the resource transfer, and verify that the funds associated with the resource transfer have not already been allocated for other resource transfers.

As previously discussed above, the one or more users 4 and/or the nodes through which the users 4 access the one or more block chains, may require authentication. The user 4 may be required to authenticate the user's identity before accessing the block chains. Likewise, one or more nodes, administrators or users of the block chains, or other entities interacting with or using the one or more block chains may be required to authenticate their identity for access to a particular feature or function of an application, device, and/or general or specific access to the one or more block chains, or the specific portions of the block chain therein, within the distributed block chain network.

Numerous types and levels of user authentication exist. For example, a user 4 may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication.

The different types of authentication may provide differing degrees of confidence regarding the authentication using such types. For example, if a username by itself is used for a first user authentication, and a username along with a password is used for a second authentication, then the second authentication should provide a higher confidence regarding the authentication because of the additional layer of authentication required. Further, within the types of authentication, varying levels of confidence may be used. For example, when using a password, an administrator may require users to create a password according to strict rules designed to increase the security level of the password, and therefore increase the confidence of any authentication using the password.

Accordingly, a continuum of authentication may be used to quantify (or dictate) the levels of authentication. Likewise, a continuum of functions permitted may be used to quantify (or dictate) the number or context in which functions are permitted.

Referring to FIG. 6A, a continuum of authentication 600A is illustrated according to embodiments of the invention. On the left-hand side of the continuum, a "zero authentication" requires no authentication credentials. On the right-hand side of the continuum, a "hard authentication" requires full authentication credentials. This means that it requires the strictest combination of credentials. In between the two extremes, "a soft authentication" requires minimal credentials, moderate credentials or most credentials for various points along the continuum. The continuum generally represents the number of credentials required and/or the relative strength of the credentials required for that point on the continuum. As discussed below with reference to FIG. 6C, the continuum of authentication 600A may be coupled with an application functions permitted continuum 600B, first illustrated in FIG. 6B.

Referring to FIG. 6B, the application functions permitted continuum 600B illustrates various levels of application functions permitted. Functions may refer to what user actions may be taken within the one or more block chains (e.g., see resource transfers placed on the block chain, validate resource transfers, stored and/or disseminate information). More specifically, this may refer to whether a specific function is permitted at a certain point on the continuum and/or the context in which a certain function is permitted. The left-hand side of the continuum indicates that no functions are permitted, and the right-hand side of the continuum indicates that all functions are permitted. In between the extremes, minimal functions are permitted, moderate functions are permitted and most functions are permitted. Thus, any given point along the continuum 600B corresponds with a certain amount and/or number of functions that are permitted and/or the context in which certain functions are permitted. For example, one user may only view an event, another user may view and disseminate an event to a public block chain, and another user may view, validate, and disseminate an event using the block chains described herein.

Referring now to FIG. 6C, a diagram 600C illustrates a coupling of the application functions permitted continuum 600B and the levels of authentication continuum 600A. As shown, the continua 600B and 600A may be coupled with one another such that the various points along the continua intersect at specific points of the coupled continuum. For example, one continuum may be moved left or right with respect to the other continuum in order to achieve a different relationship between the functions permitted and the credentials required. Accordingly, for a given coupling, a specific point on continuum 600B provides that a particular function or functions may be permitted given that a specified level of authentication credentials are supplied, as indicated by the corresponding point on continuum 600A. For example, a financial institution and/or a user may arrange the continua 600B and 600A with respect to one another and may adjust the arrangement based on changing desires or goals. In this way a user may only be able to view an event within a block chain if the user only provides user authentication, but the same user may be able to view, validate, and disseminate an event if the user provides user authentication along with node authentication (e.g., the user provides a username and password and the user is accessing the block chain through a verified node associated with a particular entity).

In some embodiments, one or both the continua 600B and 600A may have weighted scales such that, as a point on the continuum is moved, the corresponding functions permitted and/or level of authentication required may change exponentially or otherwise. Furthermore, in various embodiments, other representations of the various functions permitted that correspond with the various levels of authentication may be used by the invention.

Referring now to FIG. 6D, a diagram 600D illustrates a relationship between the functions permitted and the authentication types. As shown in FIG. 6D, the soft authentication continuum between zero authentication and hard authentication may include one or more authentication types (A, B, C in the Figure). In one aspect, the one or more authentication types corresponding to the one or more authentication credentials received from the user and one or more functions associated with the application permitted for user access are positively correlated. In additional examples, a username may enable the user to gain access to validation of events (e.g., resource transfers) on a block chain, while a username and password may enable the user to disseminate information related to the validation of events (e.g., resource transfers), and a username, password and challenge question may enable the user to gain complete access to all the functions of the block chain (e.g., take all actions with respect to events, such as resource transfers).

In some embodiments of the invention one or more of the systems described herein may be combined with each other, or otherwise perform the functions of the other systems described herein. In other embodiments of the invention one or more of the applications described herein may be combined with each other, or otherwise perform the functions of the other applications described herein. Furthermore, the applications may be any type of application, such as an application stored on a desktop, server, or other device, a mobile application stored on a mobile device, a cloud application, or other like application. As such, the applications described herein, or portions of the applications described herein may be stored and operated on any of the systems, devices, or components thereof described herein. For example, a portion of the block chain application 17 may be stored on the user computer systems 20 and/or entity systems 30, 40, 50, in order to achieve the inventions described herein.

It should be understood, that the systems, devices, and components described in FIGS. 1 and 2, or other devices not specifically described herein, may be configured to establish an electronic communications link with each other in order to accomplish the steps of the processes described herein. The link may be an internal link within the same entity (e.g., within the same financial institution for the nodes or components within the nodes) or an external link with the other systems of other entities (e.g., nodes or other systems controlled by other entities). The information within the block chains may be made continuously available, however, continuously available does not necessarily mean that the sources actually continuously generates data, but that a source is continuously available to generate and send data real-time (e.g., instantaneously and/or within a few seconds, or the like) of receiving a request for it. In any case, the sources may be continuously available to receive and/or generate information, in some cases in digitized data in Internet Protocol (IP) packet format.

Moreover, it should be understood that the process flows described herein include transforming the information sent and/or received from the applications of the different systems (e.g., internally or externally) from one or more data formats into a data format associated with the block chain application 17 for use by the one or more users 4. There are many ways in which information is converted within the block chain system environment 1. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

In accordance with embodiments of the invention, the terms "financial institution" and "financial entity" include any organization that processes financial resource transfers including, but not limited to, banks, credit unions, savings and loan associations, investment companies, stock brokerages, asses management firms, insurance companies and the like. In specific embodiments of the invention, use of the term "bank" is limited to a financial entity in which account-bearing customers conduct financial resource transfers, such as account deposits, withdrawals, transfers and the like.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. patent application Ser. No. | Title | Filed On |
|---|---|---|---|
| 6823US1.014033.2555 | 14/942,326 | TRANSPARENT SELF-MANAGING REWARDS PROGRAM USING BLOCKCHAIN AND SMART CONTRACTS | Nov. 16, 2015 |
| 6908US1.014033.2652 | 15/041,555 | BLOCK CHAIN ALIAS FOR PERSON-TO-PERSON PAYMENTS | Feb. 11, 2016 |
| 6908USP1.014033.2556 | 62/253,935 | BLOCK CHAIN ALIAS PERSON-TO-PERSON PAYMENT | Nov. 11, 2015 |
| 6985US1.014033.2605 | 15/041,566 | BLOCK CHAIN ALIAS PERSON-TO-PERSON PAYMENTS | Feb. 11, 2016 |
| 6988US1.014033.2607 | | SYSTEM FOR CONVERSION OF AN INSTRUMENT FROM A NON-SECURED INSTRUMENT TO A SECURED INSTRUMENT IN A PROCESS DATA NETWORK | Concurrently Herewith |
| 6989US1.014033.2608 | | SYSTEM FOR EXTERNAL SECURE ACCESS TO PROCESS DATA NETWORK | Concurrently Herewith |
| 6990US1.014033.2609 | | SYSTEM FOR PROVIDING LEVELS OF SECURITY ACCESS TO A PROCESS DATA NETWORK | Concurrently Herewith |
| 6991USP1.014033.2610 | 62/293,585 | SYSTEM FOR SECURE ROUTING OF DATA TO VARIOUS NETWORKS FROM A PROCESS DATA NETWORK | Feb. 10, 2016 |
| 6992USP1.014033.2611 | 62/293,620 | SYSTEM FOR CENTRALIZED CONTROL OF SECURE ACCESS TO PROCESS DATA NETWORK | Feb. 10, 2016 |
| 6994US1.014033.2613 | | SYSTEM FOR CONTROL OF DEVICE IDENTITY AND USAGE IN A PROCESS DATA NETWORK | Concurrently Herewith |
| 6996US1.014033.2615 | | SYSTEM FOR ESTABLISHING SECURE ACCESS FOR USERS IN A PROCESS DATA NETWORK | Concurrently Herewith |
| 6997US1.014033.2616 | | SYSTEM FOR ALLOWING EXTERNAL VALIDATION OF DATA IN A PROCESS DATA NETWORK | Concurrently Herewith |
| 6998US1.014033.2719 | | SYSTEM FOR CONVERSION OF AN INSTRUMENT FROM A NON-SECURED INSTRUMENT TO A SECURED INSTRUMENT IN A PROCESS DATA NETWORK | Concurrently Herewith |
| 6998USP1.014033.2617 | 62/287,293 | SYSTEM FOR CONVERSION OF AN INSTRUMENT FROM A NON-SECURED INSTRUMENT TO A SECURED INSTRUMENT IN A PROCESS DATA NETWORK | Jan. 26, 2016 |
| 6999US1.014033.2720 | | SYSTEM FOR TRACKING AND VALIDATION OF MULTIPLE INSTANCES OF AN ENTITY IN A PROCESS DATA NETWORK | Concurrently Herewith |

-continued

| Docket Number | U.S. patent application Ser. No. | Title | Filed On |
|---|---|---|---|
| 6999USP1.014033.2618 | 62/287,301 | SYSTEM FOR TRACKING AND VALIDATION OF MULTIPLE INSTANCES OF AN ENTITY IN A PROCESS DATA NETWORK | Jan. 26, 2016 |
| 7000US1.014033.2721 | | SYSTEM FOR TRACKING AND VALIDATION OF AN ENTITY IN A PROCESS DATA NETWORK | Concurrently Herewith |
| 7000USP1.014033.2619 | 62/287,298 | SYSTEM FOR TRACKING AND VALIDATION OF AN ENTITY IN A PROCESS DATA NETWORK | Jan. 26, 2016 |
| 7001US1.014033.2620 | | SYSTEM FOR ROUTING OF PROCESS AUTHORIZATIONS AND SETTLEMENT TO A USER IN A PROCESS DATA NETWORK | Concurrently Herewith |
| 7002US1.014033.2621 | | SYSTEM FOR ROUTING OF PROCESS AUTHORIZATION AND SETTLEMENT TO A USER IN PROCESS DATA NETWORK BASED ON SPECIFIED PARAMETERS | Concurrently Herewith |
| 7003US1.014033.2622 | | SYSTEM FOR GRANT OF USER ACCESS AND DATA USAGE IN A PROCESS DATA NETWORK | Concurrently Herewith |
| 7033US1.014033.2638 | | SYSTEM FOR IMPLEMENTING A DISTRIBUTED LEDGER ACROSS MULTIPLE NETWORK NODES | Concurrently Herewith |
| 7038US1.014033.2643 | | SYSTEM FOR EXTERNAL VALIDATION OF PRIVATE-TO-PUBLIC TRANSITION PROTOCOLS | Concurrently Herewith |
| 7039US1.014033.2644 | | SYSTEM FOR EXTERNAL VALIDATION OF DISTRIBUTED RESOURCE STATUS | Concurrently Herewith |
| 7040US1.014033.2645 | | SYSTEM FOR TRACKING TRANSFER OF RESOURCES IN A PROCESS DATA NETWORK | Concurrently Herewith |
| 7041US1.014033.2651 | | SYSTEM FOR MANAGING SERIALIZABILITY OF RESOURCE TRANSFERS IN A PROCESS DATA NETWORK | Concurrently Herewith |
| 7042US1.014033.2640 | | SYSTEM TO ENABLE CONTACTLESS ACCESS TO A TRANSACTION TERMINAL USING A PROCESS DATA NETWORK | Concurrently Herewith |

The invention claimed is:

1. A system for supporting and controlling access to a block chain distributed network including a private block chain portion and a public block chain portion through which users take actions on events, the system comprising:

one or more memory devices storing computer-readable program code; and one or more processing devices operatively coupled to the one or more memory devices, wherein the one or more processing devices are configured to execute the computer-readable program code to:

receive a request from one or more users to access the private block chain portion of the block chain distributed network, wherein the private block chain portion comprises one or more private nodes;

receive authentication credentials from the one or more users in order to access the private block chain portion;

authenticate the one or more users to access the private block chain portion;

receive a request from the one or more users to take a private action with respect to an event on the private block chain portion, wherein private information associated with the event remains private within the private block chain portion, wherein the event is a resource transfer from a customer to an entity using a financial account from a financial institution, wherein the private action is validating the resource transfer, and wherein the private information is private resource transfer information;

identify limits, wherein the limits comprise one or more user limits, one or more private node limits, one or more entity limits, one or more event limits, and one or more private action limits;
compare the private action taken and the one or more users, the one or more private nodes, the entity, and the event associated with the private action to the limits, including the one or more user limits, the one or more private node limits, the one or more entity limits, the one or more event limits, and the one or more private action limits;
allow the private action to proceed when the limits are met;
store the private information within the private block chain portion;
receive a request from the one or more users to take a public action with respect to the event on the public block chain portion of the block chain distributed network, wherein the public block chain portion comprises one or more public nodes, wherein public information associated with the event remains public within the public block chain portion, wherein the public action is confirmation of allowance or denial of the resource transfer, and wherein the public information is public resource transfer information; and
store the public information within the public block chain portion.

2. The system of claim 1, wherein the private resource transfer information comprises one or more account numbers, one or more user names, or one or more values of the resource transfer, and wherein the public resource transfer information comprises one or more alias account numbers, one or more alias user names, one or more alias merchants, and one or more alias amounts.

3. The system of claim 1, wherein the private information is stored on a private general ledger and the public information is stored on a public general ledger.

4. The system of claim 1, wherein the private block chain portion is a private block chain and the public block chain portion is a public block chain, wherein the private block chain and the public block chain are separate block chains that can electronically communicate with each other.

5. The system of claim 1, wherein the private block chain portion and the public block chain portion are portions of a hybrid block chain.

6. The system of claim 1, wherein the one or more processing devices are further configured to execute the computer-readable program code to:
issue an action authentication, wherein the action authentication identifies that the event was verified on the private block chain portion; and
publish the action authentication on the public block chain portion.

7. The system of claim 1, wherein a single entity controls access to the private block chain portion with the private nodes.

8. The system of claim 1, wherein the authentication credentials comprise user authentication credentials and node authentication credentials, and wherein authenticating the one or more users to access the private block chain portion comprises authenticating the one or more users and the one or more private nodes from which the one or more users are accessing the private block chain portion.

9. The system of claim 1, wherein the one or more processing devices are further configured to execute the computer-readable program code to:
receive the one or more user limits, the one or more private node limits, the one or more entity limits, the one or more event limits, and the one or more private action limits.

10. The system of claim 1, wherein the event further comprises a contract between entities, an analyst report, or a financial report.

11. A method for supporting and controlling access to a block chain distributed network including a private block chain portion and a public block chain portion through which users take actions on events, the method comprising:
receiving, by one or more processing devices, a request from one or more users to access the private block chain portion of the block chain distributed network, wherein the private block chain portion comprises one or more private nodes;
receiving, by the one or more processing devices, authentication credentials from the one or more users in order to access the private block chain portion;
authenticating, by the one or more processing devices, the one or more users to access the private block chain portion;
receiving, by the one or more processing devices, a request from the one or more users to take a private action with respect to an event on the private block chain portion, wherein private information associated with the event remains private within the private block chain portion, wherein the event is a resource transfer from a customer to an entity using a financial account from a financial institution, wherein the private action is validating the resource transfer, and wherein the private information is private resource transfer information;
identifying, by the one or more processing devices, limits, wherein the limits comprise one or more user limits, one or more private node limits, one or more entity limits, one or more event limits, and one or more private action limits;
comparing, by the one or more processing devices, the private action taken and the one or more users, the one or more private nodes, the entity, and the event associated with the private action to the limits, including the one or more user limits, the one or more private node limits, the one or more entity limits, the one or more event limits, and the one or more private action limits;
allowing, by the one or more processing devices, the private action to proceed when the limits are met;
storing, by the one or more processing devices, the private information within the private block chain portion;
receiving, by the one or more processing devices, a request from the one or more users to take a public action with respect to the event on the public block chain portion of the block chain distributed network, wherein the public block chain portion comprises one or more public nodes, wherein public information associated with the event remains public within the public block chain portion, wherein the public action is confirmation of allowance or denial of the resource transfer, and wherein the public information is public resource transfer information; and
storing, by the one or more processing devices, the public information within the public block chain portion.

12. The method of claim 11, wherein the private resource transfer information comprises one or more account numbers, one or more user names, or one or more values of the resource transfer, and wherein the public resource transfer information comprises one or more alias account numbers, one or more alias user names, one or more alias merchants, and one or more alias amounts.

13. The method of claim 11, wherein the private information is stored on a private general ledger and the public information is stored on a public general ledger.

14. The method of claim 11, wherein the private block chain portion is a private block chain and the public block chain portion is a public block chain, wherein the private block chain and the public block chain are separate block chains that can electronically communicate with each other.

15. The method of claim 11, wherein the private block chain portion and the public block chain portion are portions of a hybrid block chain.

16. The method of claim 11, wherein further comprising:
   issuing, by the one or more processing devices, an action authentication, wherein the action authentication identifies that the event was verified on the private block chain portion; and
   publishing, by the one or more processing devices, the action authentication on the public block chain portion.

17. The method of claim 11, wherein a single entity controls access to the private block chain portion with the private nodes.

18. The method of claim 11, wherein the authentication credentials comprise user authentication credentials and node authentication credentials, and wherein authenticating the one or more users to access the private block chain portion comprises authenticating the one or more users and the one or more private nodes from which the one or more users are accessing the private block chain portion.

19. The method of claim 11, further comprising:
   receiving, by the one or more processing devices, the one or more user limits, the one or more private node limits, the one or more entity limits, the one or more event limits events, and the one or more private action limits.

20. A computer program product for supporting and controlling access to a block chain distributed network including a private block chain portion and a public block chain portion through which users take actions on events, the computer program product comprising at least one non-transitory computer-readable medium having computer-readable program code portions embodied therein, the computer-readable program code portions comprising:
   an executable portion configured to receive a request from one or more users to access the private block chain portion of the block chain distributed network, wherein the private block chain portion comprises one or more private nodes;
   an executable portion configured to receive authentication credentials from the one or more users in order to access the private block chain portion;
   an executable portion configured to authenticate the one or more users to access the private block chain portion;
   an executable portion configured to receive a request from the one or more users to take a private action with respect to an event on the private block chain portion, wherein private information associated with the event remains private within the private block chain portion, wherein the event is a resource transfer from a customer to an entity using a financial account from a financial institution, wherein the private action is validating the resource transfer, and wherein the private information is private resource transfer information;
   an executable portion configured to identify limits, wherein the limits comprise one or more user limits, one or more private note limits, one or more entity limits, one or more event limits, and one or more private action limits;
   an executable portion configured to compare the private action taken and the one or more users, the one or more private nodes, the entity, and the event associated with the private action to the limits, including the one or more user limits, the one or more private node limits, the one or more entity limits, the one or more event limits, and the one or more private action limits;
   an executable portion configured to allow the private action to proceed when the limits are met;
   an executable portion configured to store the private information within the private block chain portion;
   an executable portion configured to receive a request from the one or more users to take a public action with respect to the event on the public block chain portion of the block chain distributed network, wherein the public block chain portion comprises one or more public nodes, wherein public information associated with the event remains public within the public block chain portion, wherein the public action is confirmation of allowance or denial of the resource transfer, and wherein the public information is public resource transfer information; and
   an executable portion configured to store the public information within the public block chain portion.

* * * * *